(12) United States Patent
Yamamoto

(10) Patent No.: US 9,530,085 B2
(45) Date of Patent: Dec. 27, 2016

(54) INFORMATION PROCESSING APPARATUS AND DATA PROCESSING METHOD FOR CONTROLLING AN OPERATION CLOCK SIGNAL

(71) Applicant: KYOCERA Document Solutions Inc., Osaka-shi, Osaka (JP)

(72) Inventor: Yuki Yamamoto, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/995,516

(22) Filed: Jan. 14, 2016

(65) Prior Publication Data

US 2016/0210543 A1 Jul. 21, 2016

(30) Foreign Application Priority Data

Jan. 16, 2015 (JP) ................. 2015-006348

(51) Int. Cl.
| | | |
|---|---|---|
| G06F 15/00 | (2006.01) | |
| G06K 15/00 | (2006.01) | |
| G06F 1/00 | (2006.01) | |
| G06K 1/00 | (2006.01) | |
| G06F 1/04 | (2006.01) | |
| G06F 1/32 | (2006.01) | |
| H04N 1/00 | (2006.01) | |

(52) U.S. Cl.
CPC ............. *G06K 15/4055* (2013.01); *G06F 1/04* (2013.01); *G06F 1/324* (2013.01); *H04N 1/0032* (2013.01); *H04N 1/0057* (2013.01); *H04N 1/00795* (2013.01); *H04N 2201/0094* (2013.01)

(58) Field of Classification Search
CPC ........ G06K 15/4055; G06F 1/04; G06F 1/324; H04N 1/0032; H04N 1/0057; H04N 1/00795
USPC ............................. 358/1.1, 1.14, 1.15, 1.13
See application file for complete search history.

(56) References Cited

U.S. PATENT DOCUMENTS

2012/0002249 A1* 1/2012 Kim ....................... G03G 15/60
358/475

FOREIGN PATENT DOCUMENTS

| JP | 2006293768 A | 10/2006 |
|---|---|---|
| JP | 2012009971 A | 1/2012 |
| JP | 2014045406 A | 3/2014 |

* cited by examiner

*Primary Examiner* — Douglas Tran
(74) *Attorney, Agent, or Firm* — Alleman Hall McCoy Russell & Tuttle LLP

(57) ABSTRACT

An information processing apparatus includes a plurality of modules and a change processing portion. The modules are capable of executing data processing on data stored in a memory connected thereto via a bus. The change processing portion is configured to change a frequency of an operation clock signal to be supplied to each module, in accordance with either one of or both a number and types of the modules that execute the data processing in parallel, during execution of a specific data process of executing the data processing by each module at a preset execution timing.

5 Claims, 4 Drawing Sheets

INFORMATION PROCESSING APPARATUS AND DATA PROCESSING METHOD FOR CONTROLLING AN OPERATION CLOCK SIGNAL

INCORPORATION BY REFERENCE

This application is based upon and claims the benefit of priority from the corresponding Japanese Patent Application No. 2015-006348 filed on Jan. 16, 2015, the entire contents of which are incorporated herein by reference.

BACKGROUND

The present disclosure relates to an information processing apparatus including a plurality of modules and a data processing method executed by the information processing apparatus.

An information processing apparatus such as a copy machine may be provided with a plurality of modules which are able to execute data processing on data stored in a memory connected thereto via a bus. In addition, a configuration of decreasing the frequency of an operation clock signal to be supplied to each module, when an operation mode of the information processing apparatus shifts from a normal mode to a power saving mode, is known.

SUMMARY

An information processing apparatus according to one aspect of the present disclosure includes a plurality of modules and a change processing portion. The modules are capable of executing data processing on data stored in a memory connected thereto via a bus. The change processing portion is configured to change a frequency of an operation clock signal to be supplied to each module, in accordance with either one of or both a number and types of the modules that execute the data processing in parallel, during execution of a specific data process of executing the data processing by each module at a preset execution timing.

A data processing method according to another aspect of the present disclosure is executed by an information processing apparatus including a plurality of modules capable of executing data processing on data stored in a memory connected thereto via a bus, the data processing method comprising: executing a specific data process of executing the data processing by each module at a preset execution timing; and changing a frequency of an operation clock signal to be supplied to each module, in accordance with either one of or both a number and types of the modules that execute the data processing in parallel, during execution of the specific data process.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the accompanying drawings in order to allow understanding of the present disclosure. It should be noted that the following embodiments are examples embodying the present disclosure, and, by nature, do not limit the technical scope of the present disclosure.

[Schematic Configuration of Image Processing Apparatus 10]

First, a schematic configuration of an image processing apparatus 10 according to an embodiment of the present disclosure will be described with reference to FIGS. 1 and 2. Here, FIG. 1 is a schematic cross-sectional view of the image processing apparatus 10.

Figure 1:
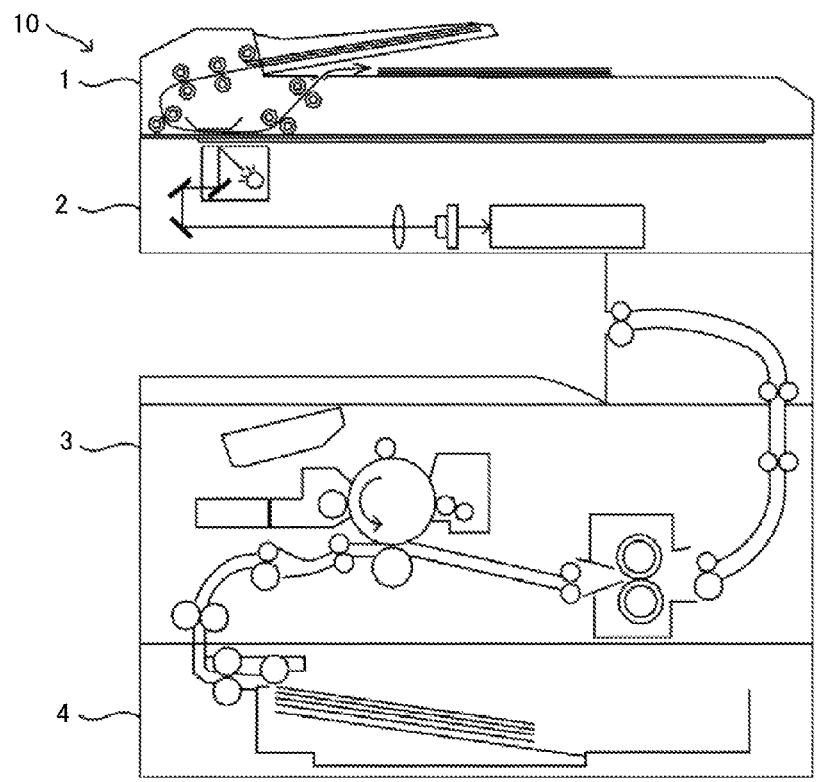
FIG. 1 is a diagram showing the configuration of an image processing apparatus according to an embodiment of the present disclosure.
Figure 2:
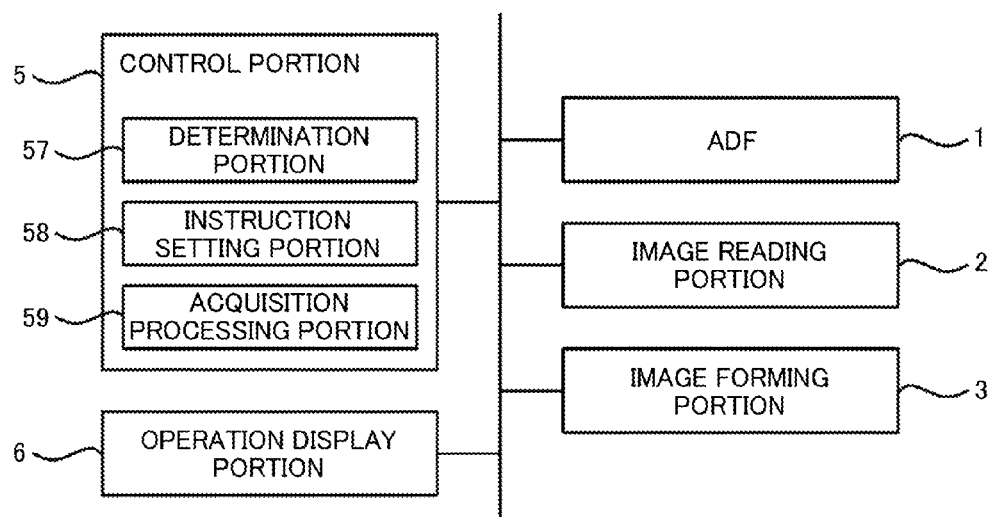
FIG. 2 is a block diagram showing the system configuration of the image processing apparatus according to the embodiment of the present disclosure.

As shown in FIGS. 1 and 2, the image processing apparatus 10 includes an ADF 1, an image reading portion 2, an image forming portion 3, a sheet feed portion 4, a control portion 5, and an operation display portion 6. The image processing apparatus 10 is a multifunction peripheral having a printer function to form an image on the basis of image data as well as a plurality of functions such as a scanning function, a facsimile function, or a copy function. Here, the apparatus including the control portion 5 is an example of an information processing apparatus in the present disclosure. In addition, the present disclosure is applicable to information processing apparatuses such as a scanner apparatus, a printer apparatus, a facsimile apparatus, a copy machine, a personal computer, a tablet terminal, and a smartphone.

The ADF 1 is an automatic document feeder which includes a document set portion, a plurality of conveying rollers, a document holder, and a sheet discharge portion, and conveys a document sheet to be read by the image reading portion 2. The image reading portion 2 includes a document table, a light source, a plurality of mirrors, an optical lens, and a charge coupled device (CCD), and is able to execute an image reading process of reading image data from a document sheet placed on the document table or a document sheet conveyed by the ADF 1.

The image forming portion 3 is able to execute an image forming process (a printing process) of forming an image by electrophotography on the basis of image data read by the image reading portion 2 or image data inputted from an external information processing apparatus such as a personal computer. Specifically, the image forming portion 3 includes a photosensitive drum, a charging device, a laser scanning unit (LSU), a developing device, a transfer roller, a cleaning device, a fixing roller, a pressure roller, and a sheet discharge tray. In the image forming portion 3, an image is formed on a sheet fed from the sheet feed portion 4, and the sheet on which the image has been formed is discharged to the sheet discharge tray. The sheet is a sheet material such as paper, coated paper, a postcard, an envelope, and an OHP sheet.

The operation display portion 6 includes a display portion, such as a liquid crystal display, which displays various kinds of information in accordance with control instructions from the control portion 5; and an operation portion, such as an operation key or a touch panel, which inputs various kinds of information to the control portion 5 in accordance with operations performed by a user.

Figure 3:
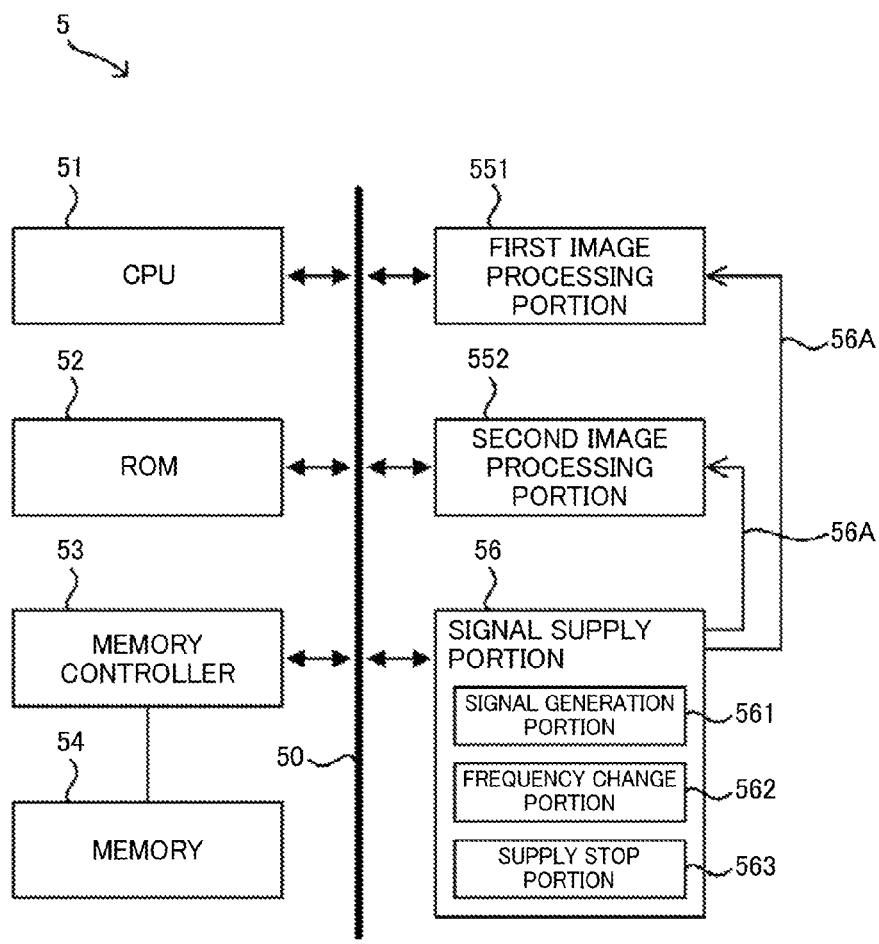
FIG. 3 is a block diagram showing the configuration of a control portion of the image processing apparatus according to the embodiment of the present disclosure.

Next, the control portion 5 will be described with reference to FIG. 3.

The control portion 5 centrally controls each component of the image processing apparatus 10. Specifically, as shown in FIG. 3, the control portion 5 includes a CPU 51, a ROM 52, a memory controller 53, a memory 54, a first image processing portion 551, a second image processing portion 552, and a signal supply portion 56.

Here, in the control portion 5, the CPU 51, the ROM 52, the memory controller 53, the first image processing portion 551, the second image processing portion 552, and the signal supply portion 56 are connected to each other via a bus 50 so as to be able to communicate with each other.

The CPU 51 is a processor which executes various calculation processes. In addition, the ROM 52 is a non-volatile storage unit in which information such as control programs for causing the CPU 51 to execute various processes is stored in advance. The CPU 51 centrally controls the image processing apparatus 10 by executing various control programs stored in advance in the ROM 52.

The memory controller 53 executes a process of writing data into the memory 54 or reading data from the memory 54, in response to a request for accessing the memory 54 from the CPU 51, the first image processing portion 551, or the second image processing portion 552.

The memory 54 is a volatile or non-volatile storage unit which is used as a temporary storage memory (working area) for various processes executed by the CPU 51, the first image processing portion 551, and the second image processing portion 552. For example, the memory 54 is a DDR-SDRAM.

The first image processing portion 551 and the second image processing portion 552 each are an image processing circuit which is able to execute data processing on data stored in the memory 54. For example, the first image processing portion 551 reads image data from the memory 54, executes a compression process on the image data, and stores the image data subjected to the compression process, into the memory 54. In addition, the second image processing portion 552 reads image data from the memory 54, executes a rotation process on the image data, and stores the image data subjected to the rotation process, into the memory 54. Here, the first image processing portion 551 and the second image processing portion 552 are an example of a plurality of modules in the present disclosure. In the following description, the first image processing portion 551 and the second image processing portion 552 are referred to as modules 55 if it is not necessary to distinguish these portions 551 and 552 from each other.

Here, in the image processing apparatus 10, a specific data process of executing the above-described data processing by each module 55 at a preset execution timing is executed. Specifically, in the specific data process, after a predetermined time period has elapsed from the time when execution of the compression process by the first image processing portion 551 on data stored in the memory 54 is started, the rotation process by the second image processing portion 552 on the data is executed. For example, the specific data process is executed as a part of the above-described image reading process when the image reading process is executed in the image processing apparatus 10.

The signal supply portion 56 supplies, to each module 55, an operation clock signal 56A for operating each module 55. Specifically, as shown in FIG. 3, the signal supply portion 56 includes a signal generation portion 561, a frequency change portion 562, and a supply stop portion 563.

The signal generation portion 561 is an oscillator circuit which generates the operation clock signal 56A. For example, the signal generation portion 561 generates the operation clock signal 56A having a frequency of 200 MHz.

The frequency change portion 562 is able to change the frequency of the operation clock signal 56A to be supplied to each module 55. Specifically, the frequency change portion 562 is a frequency divider circuit which decreases the frequency of the operation clock signal 56A generated by the signal generation portion 561, in accordance with a control signal inputted from the CPU 51 or the like via the bus 50. For example, the frequency change portion 562 decreases the frequency of the operation clock signal 56A of 200 MHz generated by the signal generation portion 561, to a frequency of 150 MHz or 100 MHz.

The supply stop portion 563 is able to stop supply of the operation clock signal 56A to each module 55 per module 55. Specifically, the supply stop portion 563 is an electronic circuit which stops supply of the operation clock signal 56A to the module 55 in accordance with a control signal inputted from the CPU 51 or the like via the bus 50.

Meanwhile, in the image processing apparatus 10, when the data processing is executed in parallel by a plurality of the modules 55 during execution of the specific data process, pressure is imposed on the data transmission band of the bus. In this case, an amount of data that can be processed by each module 55 decreases, and thus there is no use in inputting the operation clock signal 56A having a high frequency to each module 55. On the other hand, in the image processing apparatus 10, as described below, it is possible to reduce power consumption of each of the plurality of the modules 55 that execute the data processing in parallel.

Specifically, as shown in FIG. 2, the control portion 5 includes a determination portion 57, an instruction setting portion 58, and an acquisition processing portion 59. Specifically, the control portion 5 functions as the determination portion 57, the instruction setting portion 58, and the acquisition processing portion 59 by executing, with the CPU 51, the control programs stored in the ROM 52. Here, the control portion 5, which functions as the determination portion 57, the instruction setting portion 58, and the acquisition processing portion 59, is an example of a change processing portion in the present disclosure.

On the basis of the execution timings, the determination portion 57 determines the number of the modules 55 that execute the data processing in parallel at each execution timing.

The instruction setting portion 58 stores an execution instruction for the data processing to each module 55, into the memory 54. Here, the execution instruction includes: a change instruction for the frequency of the operation clock signal 56A which change instruction corresponds to the number of the modules 55 that execute the data processing in parallel, the number being determined by the determination portion 57; and an operation stop instruction for stopping operation after end of the data processing. Specifically, the instruction setting portion 58 stores the execution instruction into a descriptor table which is set on the memory 54.

Figure 4:
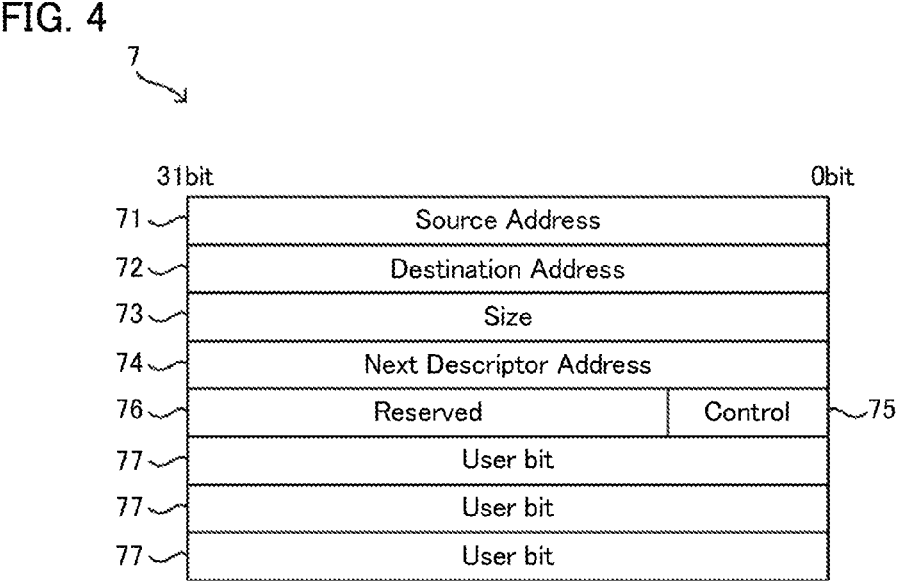
FIG. 4 is a diagram showing an example of an execution instruction which is set on a memory by the control portion of the image processing apparatus according to the embodiment of the present disclosure.

FIG. 4 shows an example of the descriptor table which is set on the memory 54 by the instruction setting portion 58. A descriptor table 7 shown in FIG. 4 has a storage area of 32 bites on the memory 54. Here, in an area of reference numeral 71 shown in FIG. 4, the address of data which is a target for the data processing by each module 55 is stored. In an area of reference numeral 72, the address of a transfer destination of the data subjected to the data processing by each module 55 is stored. In an area of reference numeral 73, the size of the data which is the target for the data processing is stored. In an area of reference numeral 74, the address of the next descriptor table in which the execution instruction is stored is stored. In an area of reference numeral 75, control information for causing each module 55 to execute the data processing is stored.

Meanwhile, an area of reference numeral 76 shown in FIG. 4 is an area reserved for function expansion or the like, and each area of reference numeral 77 is an area which can be arbitrarily used by a user. In the image processing apparatus 10, the instruction setting portion 58 stores the change instruction into the area of reference numeral 76 or the area of reference numeral 77. For example, when the module 55 executes the data processing in accordance with the execution instruction, if there is no other module 55 that executes the data processing in parallel, the instruction setting portion 58 stores the change instruction for changing the frequency of the operation clock signal 56A to 200 MHz. In addition, if there is another module 55 that executes the data processing in parallel, the instruction setting portion 58 stores the change instruction for changing the frequency of the operation clock signal 56A to 150 MHz or 100 MHz.

Moreover, the instruction setting portion 58 stores the operation stop instruction, to the module 55, of stopping operation after end of the data processing, into the area of reference numeral 76 or the area of reference numeral 77 shown in FIG. 4.

On the basis of the execution timing, the acquisition processing portion 59 causes each module 55 to acquire the execution instruction stored in the memory 54. Specifically, the acquisition processing portion 59 causes each module 55 to acquire the execution instruction, by transmitting, to each module 55, an acquisition instruction including the addresses of the descriptor table in which the execution instruction is stored.

Then, each module 55 that has acquired the execution instruction in accordance with the acquisition instruction from the acquisition processing portion 59 transmits a change request for the frequency of the operation clock signal 56A, to the signal supply portion 56 in accordance with the change instruction included in the execution instruction. The frequency change portion 562 of the signal supply portion 56 changes the frequency of the operation clock signal 56A to be supplied to each module 55, in response to the change request from each module 55.

Thereafter, each module 55 executes the data processing in accordance with the execution instruction. Then, after end of the data processing, each module 55 transmits a supply stop request for stopping supply of the operation clock signal 56A, to the signal supply portion 56 in accordance with the operation stop instruction included in the execution instruction. In response to the supply stop request from each module 55, the supply stop portion 563 of the signal supply portion 56 stops supply of the operation clock signal 56A to the module 55 that has transmitted the supply stop request.

[Specific Data Process]

Figure 5:
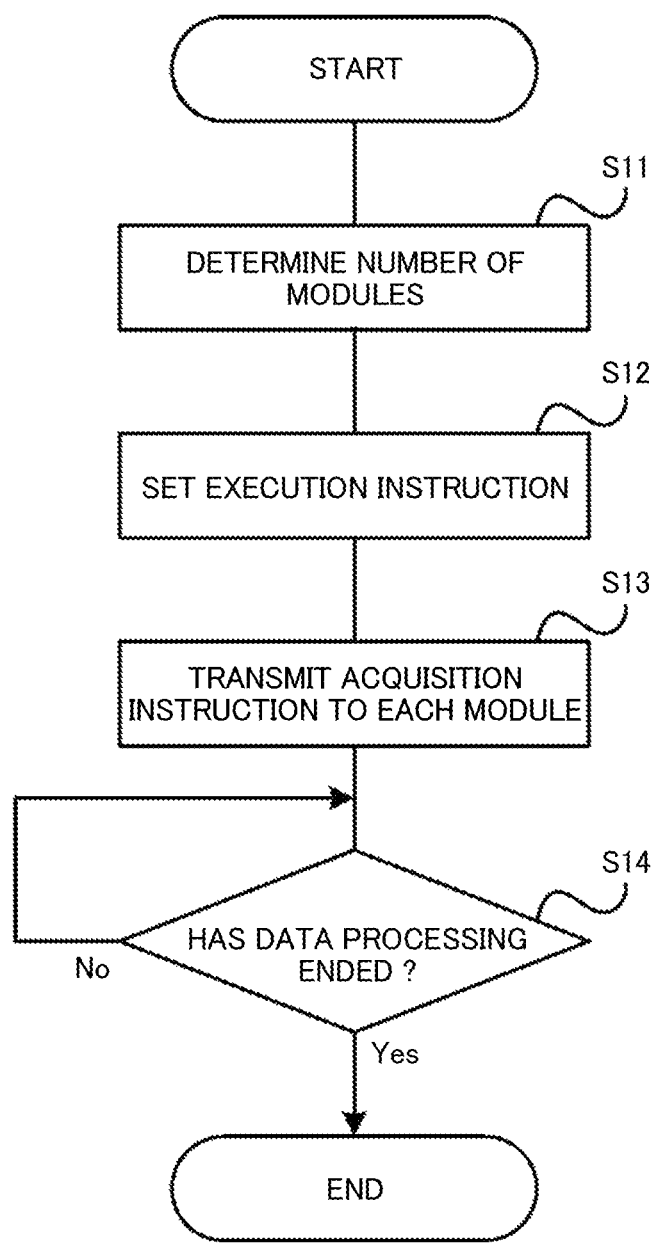
FIG. 5 is a flowchart showing an example of a specific data process executed by the control portion of the image processing apparatus according to the embodiment of the present disclosure.

Hereinafter, an example of a procedure of the specific data process executed by the control portion 5 in the image processing apparatus 10 will be described with reference to FIG. 5. Here, steps S11, S12 . . . represent numbers of process procedures (steps) to be executed by the control portion 5. In the image processing apparatus 10, the specific data process is executed, for example, as a part of the image reading process. Here, execution of the specific data process by the control portion 5 is an example of a first step in the present disclosure.

<Step S11>

First, in step S11, on the basis of the execution timings, the control portion 5 determines the number of the modules 55 that execute the data processing in parallel at each execution timing. Here, the process in step S11 is executed by the determination portion 57 of the control portion 5.

For example, when the compression process is executed by the first image processing portion 551, the control portion 5 determines that the number of the modules 55 that execute the data processing in parallel is one. In addition, when the rotation process is executed by the second image processing portion 552, the control portion 5 determines that the number of the other modules 55 that execute the data processing in parallel is two.

<Step S12>

In step S12, the control portion 5 stores the execution instruction, to each module 55, including the change instruction and the operation stop instruction into the descriptor table which is set on the memory 54. Here, the control portion 5 stores, into the memory 54, the execution instruction including the change instruction for the frequency of the operation clock signal 56A which change instruction corresponds to the number of the modules that execute the data processing in parallel, the number being determined in step S11. Here, the process in step S12 is executed by the instruction setting portion 58 of the control portion 5.

For example, the control portion 5 stores, into the memory 54, the change instruction, to the first image processing portion 551, for changing the frequency of the operation clock signal 56A to 200 MHz. In addition, the control portion 5 stores, into the memory 54, the change instruction, to the second image processing portion 552, for changing the frequency of the operation clock signal 56A to 150 MHz.

<Step S13>

In step S13, on the basis of the execution timing, the control portion 5 causes each module 55 to acquire the execution instruction stored in the memory 54 in step S12. Here, the processes in steps S11 to S13 are an example of a second step in the present disclosure. The process in step S13 is executed by the acquisition processing portion 59 of the control portion 5.

For example, first, the acquisition processing portion 59 causes the first image processing portion 551 to acquire the execution instruction. Then, the acquisition processing portion 59 causes the second image processing portion 552 to acquire the execution instruction after a predetermined time period has elapsed from the acquisition of the execution instruction by the first image processing portion 551.

<Step S14>

In step S14, the control portion 5 determines whether the data processing by each module 55 has ended.

Here, if the control portion 5 determines that the data processing by each module 55 has ended (Yes in S14), the control portion 5 ends the execution of the specific data process. In addition, if the data processing by each module 55 has not ended (No in S14), the control portion 5 waits for end of the data processing by each module 55 in step S14.

[Frequency Change Process]

Figure 6:
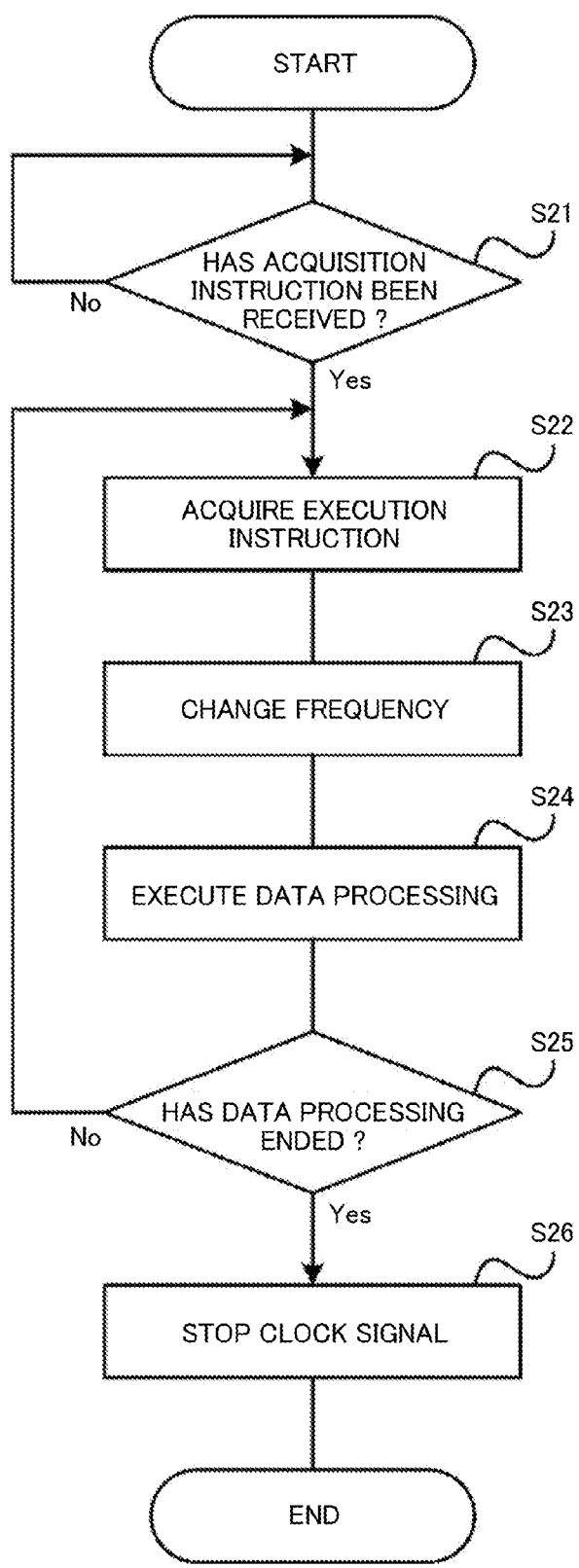
FIG. 6 is a flowchart showing an example of a frequency change process executed by each module of the image processing apparatus according to the embodiment of the present disclosure.

Next, an example of a procedure of the frequency change process executed by each of the first image processing portion 551 and the second image processing portion 552 in the image processing apparatus 10 will be described with reference to FIG. 6. The following description is given on the assumption that the second image processing portion 552 executes the frequency change process.

<Step S21>

First, in step S21, the second image processing portion 552 determines whether the acquisition instruction transmitted from the control portion 5 has been received.

Here, if the second image processing portion 552 determines that the acquisition instruction has been received (Yes in S21), the second image processing portion 552 advances the processing to step S22. If the acquisition instruction has not been received (No in S21), the second image processing portion 552 waits for reception of the acquisition instruction in step S21.

<Step S22>

In step S22, the second image processing portion 552 acquires the execution instruction from the memory 54 in accordance with the acquisition instruction acquired in step S21.

<Step S23>

In step S23, the second image processing portion 552 transmits the change request for the frequency of the operation clock signal 56A to the signal supply portion 56 in accordance with the change instruction included in the execution instruction acquired in step S22. Accordingly, the frequency of the operation clock signal 56A to be supplied to each module 55 is changed from 200 MHz to 150 MHz in accordance with the number of the modules 55 that execute the data processing in parallel.

<Step S24>

In step S24, the second image processing portion 552 executes the rotation process in accordance with the execution instruction acquired in step S22.

<Step S25>

In step S25, the second image processing portion 552 determines whether the rotation process has ended. For example, if the operation stop instruction is included in the execution instruction acquired in step S22, the second image processing portion 552 determines that the rotation process has ended.

Here, if the second image processing portion 552 determines that the rotation process has ended (Yes in S25), the second image processing portion 552 advances the processing to step S26. In addition, if the rotation process has not ended (No in S25), the second image processing portion 552 advances the processing to step S22, acquires the next execution instruction from the address, in the memory 54, indicated by the execution instruction, and executes the processes in steps S23 and S24.

<Step S26>

In step S26, the second image processing portion 552 transmits a supply stop request for stopping supply of the operation clock signal 56A, to the signal supply portion 56 in accordance with the operation stop instruction included in the execution instruction acquired in step S22. Accordingly, supply of the operation clock signal 56A to the module 55 that has ended the data processing is stopped immediately after the end of the data processing. Therefore, it is possible to stop supply of the operation clock signal 56A more rapidly than with a configuration in which the control portion 5 determines whether the data processing by each module 55 has ended, and stops supply of the operation clock signal 56A.

As described above, in the image processing apparatus 10, during execution of the specific data process, the frequency of the operation clock signal 56A to be supplied to each module 55 is changed in accordance with the number of the modules 55 that execute the data processing in parallel. Thus, it is possible to reduce power consumption of each of the plurality of the modules 55 that execute the data processing in parallel.

In another embodiment, in the image processing apparatus 10, the control portion 5 may include three or more modules 55. For example, the control portion 5 may further include a third image processing portion 553 which is able to execute a size cutting process on data stored in the memory 54, and in the specific data process, the first image processing portion 551, the second image processing portion 552, and the third image processing portion 553 may execute the data processing at preset execution timings. In this case, in accordance with the number of the modules 55 that execute the data processing in parallel at each execution timing, the frequency of the operation clock signal 56A to be supplied to each module 55 may be switched among 200 MHz, 150 MHz, and 100 MHz.

The data processing executed by each module 55 is not limited to the compression process, the rotation process, and the size cutting process, and may include various kinds of image processing such as an expansion process, a data copy process, and a gamma process.

In another embodiment, in the image processing apparatus 10, during execution of the specific data process, the frequency of the operation clock signal 56A to be supplied to each module 55 is changed in accordance with either one of or both the number and the types of the modules 55 that execute the data processing in parallel. In this case, it is possible to set the frequency of the operation clock signal 56A to be supplied to each module 55, in accordance with the contents of processing in each module 55 that executes the data processing in parallel.

The present disclosure is applicable to, for example, a network system in which a plurality of image forming apparatuses are connected.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
a plurality of image processing circuits capable of executing data processing on data stored in a memory connected thereto via a bus;
a change processing portion configured to change a frequency of an operation clock signal to be supplied to each image processing circuit, in accordance with either one of or both a number and types of the image processing circuits that execute the data processing in parallel, during execution of a specific data process of executing the data processing by each image processing circuit at a preset execution timing; and
a frequency divider circuit capable of changing the frequency of the operation clock signal to be supplied to each image processing circuit, wherein the change processing portion includes:

a central processing unit configured to store, into the memory, an execution instruction for the data processing to each image processing circuit, the execution instruction including a change instruction for the frequency of the operation clock signal, which change instruction corresponds to either one of or both the number and the types of the image processing circuits that execute the data processing in parallel; and an acquisition processor configured to cause each image processing circuit to acquire the execution instruction stored in the memory, on the basis of the execution timing; wherein the frequency divider circuit changes the frequency of the operation clock signal to be supplied to each image processing circuit, in accordance with a change request for the frequency of the operation clock signal, which change request is transmitted from the image processing circuit in accordance with the change instruction.

2. The information processing apparatus according to claim 1, wherein the change processing portion determines either one of or both the number and the types of the image processing circuits that execute the data processing in parallel, on the basis of the execution timings.

3. The information processing apparatus according to claim 1, wherein the execution instruction includes an operation stop instruction, to each image processing circuit, for stopping operation after end of the data processing, and the information processing apparatus further comprises a supply stop portion configured to stop supply of the operation clock signal to each image processing circuit, in response to a supply stop request for the operation clock signal which supply stop request is transmitted from each image processing circuit in accordance with the operation stop instruction.

4. The information processing apparatus according to claim 1, further comprising either one of or both an image reading portion capable of reading image data from a document sheet and an image forming portion capable of forming an image on the basis of image data.

5. A data processing method executed by an information processing apparatus including a plurality of modules capable of executing data processing on data stored in a memory connected thereto via a bus, the data processing method comprising:

executing a specific data process of executing the data processing by each module at a preset execution timing;

changing a frequency of an operation clock signal to be supplied to each module, in accordance with either one of or both a number and types of the modules that execute the data processing in parallel, during execution of the specific data process;

storing, into the memory, an execution instruction for the data processing to each module, the execution instruction including a change instruction for the frequency of the operation clock signal which change instruction corresponds to either one of or both the number and the types of the modules that execute the data processing in parallel;

causing each module to acquire the execution instruction stored in the memory, on the basis of the execution timing; and changing the frequency of the operation clock signal to be supplied to each module, in accordance with a change request for the frequency of the operation clock signal which change request is transmitted from the module in accordance with the change instruction.

* * * * *